(12) United States Patent
Gharachorloo et al.

(10) Patent No.: US 8,370,878 B2
(45) Date of Patent: Feb. 5, 2013

(54) MOBILE INTERFACE FOR ACCESSING INTERACTIVE TELEVISION APPLICATIONS ASSOCIATED WITH DISPLAYED CONTENT

(75) Inventors: Nader Gharachorloo, Ossining, NY (US); Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 387 days.

(21) Appl. No.: 12/725,509

(22) Filed: Mar. 17, 2010

(65) Prior Publication Data
US 2011/0231872 A1 Sep. 22, 2011

(51) Int. Cl.
*H04N 7/16* (2011.01)
*H04N 7/173* (2011.01)
*G06F 3/14* (2006.01)
*G06Q 30/00* (2012.01)
*H04H 40/00* (2008.01)

(52) U.S. Cl. .......... 725/62; 725/123; 725/131; 725/139; 725/151; 715/864; 705/14.64; 455/3.06

(58) Field of Classification Search ................ 725/62, 725/61, 28, 110, 40, 42, 43, 123, 131, 136, 725/139, 151; 715/744, 864; 705/14.64; 455/3.01, 3.02, 3.04, 3.06
See application file for complete search history.

(56) References Cited

U.S. PATENT DOCUMENTS

| | | | |
|---|---|---|---|
| 7,698,727 B2 * | 4/2010 | Kikinis et al. | 725/141 |
| 2002/0108125 A1 * | 8/2002 | Joao | 725/139 |
| 2004/0043770 A1 * | 3/2004 | Amit et al. | 455/450 |
| 2005/0132420 A1 * | 6/2005 | Howard et al. | 725/135 |
| 2005/0138674 A1 * | 6/2005 | Howard et al. | 725/136 |
| 2009/0015660 A1 * | 1/2009 | Vedantham et al. | 348/14.09 |
| 2009/0172739 A1 * | 7/2009 | Blackketter et al. | 725/51 |
| 2011/0185392 A1 * | 7/2011 | Walker | 725/82 |

* cited by examiner

*Primary Examiner* — Hoang-Vu A Nguyen-Ba (57) ABSTRACT

A media client for a subscription multimedia network presents, on a display device, program content received from a backend server. The media client also receives, from a mobile device, a signal requesting access to an interactive television application, where the interactive television application is related to the program content. The media client receives, from the backend server, data for the interactive television application, and forwards, to the mobile device, the data for the interactive television application for presentation on the mobile device.

21 Claims, 9 Drawing Sheets

MOBILE INTERFACE FOR ACCESSING INTERACTIVE TELEVISION APPLICATIONS ASSOCIATED WITH DISPLAYED CONTENT

BACKGROUND INFORMATION

Televisions are commonly used as a shared device, allowing multiple users to concurrently view programs and other content. Today's subscription multimedia services (e.g., from service providers using cable, satellite, etc.) provide interactive applications that may supplement television programming. These interactive applications are typically displayed concurrently with the television programming but may include information applicable to a single user.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription multimedia service provider to provide a mobile interface for interactive television applications. A media client (e.g., a set-top box) may communicate with one or more mobile devices (e.g., cell phones, PDAs, etc.) via a wireless connection to supply interactive television applications that can be associated with program content concurrently displayed on a corresponding display device (e.g., a television). In one implementation, the media client may serve as an intermediary device to exchange data/communications between the mobile device(s) and remote servers that facilitate the interactive applications. Thus, viewers (with a mobile device) may each participate in an interactive viewing experience while preserving television display space for shared program content.

As used herein, the term "interactive television application" may refer to an application, accessed through a media client, that may receive and respond to user input (e.g., via a remote control, control buttons, or mobile device associated with a media client). For example, an interactive television application may include variations of known social networking applications (e.g., Facebook®, Twitter®, MySpace®, etc.), image- and/or video-sharing applications (e.g., YouTube®, Blip®, Veoh®, etc.), applications from premium content providers, regional content applications (e.g., weather, traffic, local news), games, etc. In some cases, interactive television applications may also be referred to as "widgets."

Also, as used herein, the term "media client" may refer to any media processing device that may receive multimedia content over a network, and may provide such multimedia content to an attached video display device (such as a television or a computer monitor). A "subscription multimedia service," as used herein, may refer to television, telephone, networking and/or other multimedia services provided to customers over a closed distribution network, such as a cable, an optical fiber, a satellite, or a virtual private network that restricts unauthorized alteration of content delivered by a multimedia service provider. Also, as used herein, the terms "user," "viewer," "subscriber," and "customer" may refer interchangeably to a person who interacts with, orders, uploads, listens to, or plays multimedia content over a subscription multimedia service.

Figure 1A:
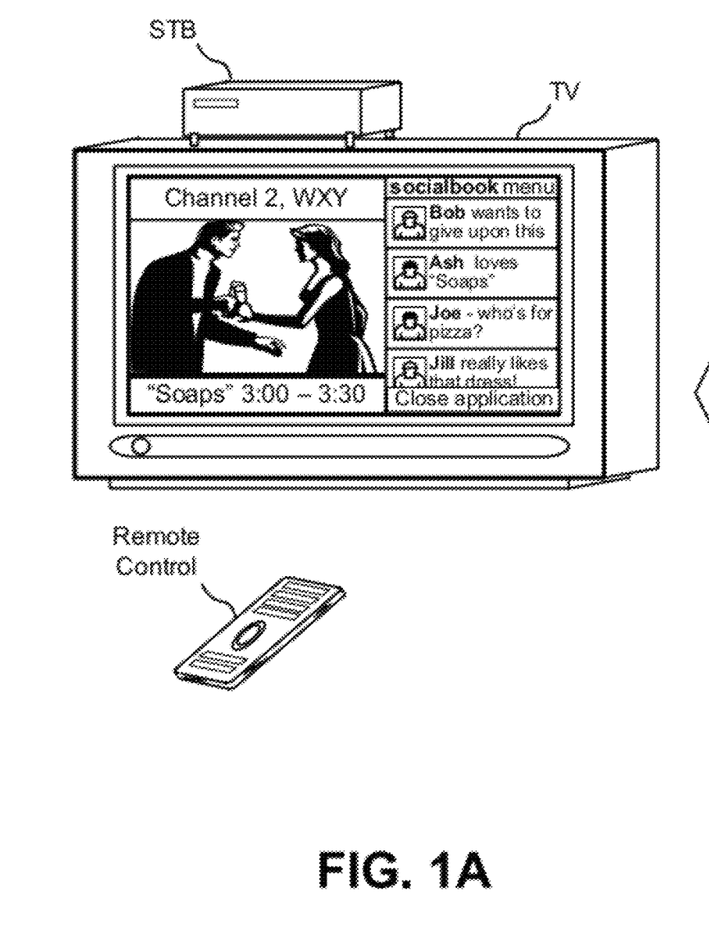
FIGS. 1A and 1B provide diagrams illustrating concepts described herein.

FIGS. 1A and 1B provide an exemplary implementation of concepts described herein. FIG. 1A provides an illustration of a television (TV) display that includes program content (e.g., a television program) and an interactive television application. Both the program content and the interactive television application may be supplied by a set-top box (STB) communicating with a backend server (not shown) for a subscription multimedia service. The interactive television application may be controlled by a user of a remote control and may provide interactive content associated with the program content. For example, the interactive television application may include a social networking interface for fans of the program content, access to interactive information related to the program content (e.g., actor biographies, links to related content, etc.), fantasy league information relating to a particular sporting event, etc. In some cases it may be desirable to use the interactive television application without having the application presented on the television display. For example, a second user (or viewer) may find the display of the interactive television application to be distracting or may desire to use a different interactive television application. Additionally, or alternatively, the user of the remote control may desire a different interface device or a larger display for the program content.

Figure 1B:
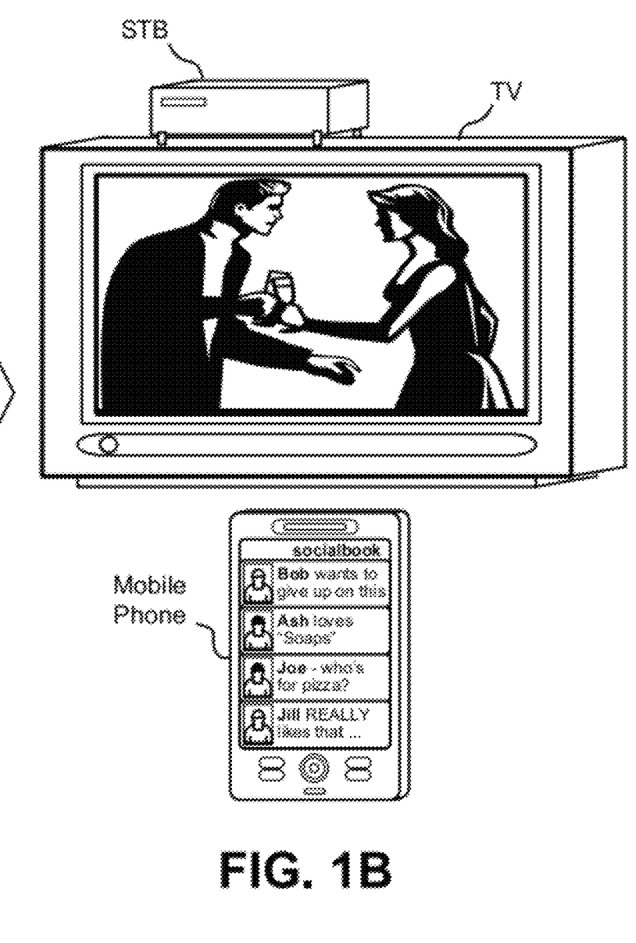

FIG. 1B provides an illustration of a television display that includes the program content (e.g., the television program) with the interactive television application being provided on a second device (e.g., a mobile phone). The original user of the remote control may shift the display of the interactive television application to the mobile phone, leaving the full television display available for the program content. The user may use the interactive television application on the mobile phone as the media client provides data through a wireless connection. Other viewers may, thus, view the program content without the distraction of the interactive television application, or the other viewers may employ a different interactive television application on another mobile device (or on the television display). In one implementation, users may toggle between the display configurations of FIGS. 1A and 1B depending on the user's preference.

Figure 2:
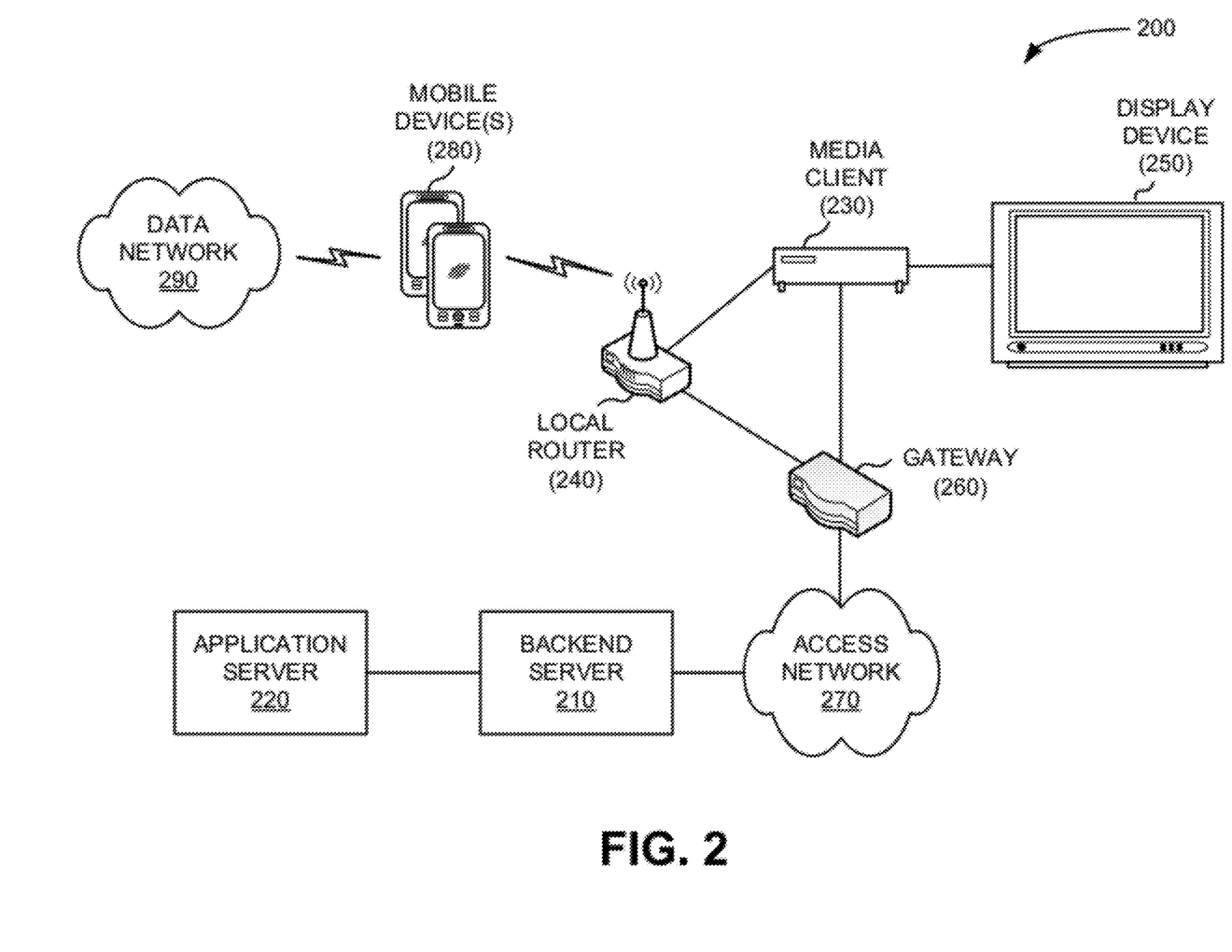
FIG. 2 depicts an exemplary network in which systems and/or methods described herein may be implemented.

FIG. 2 is a diagram of an exemplary network 200 in which systems and/or methods described herein may be implemented. As illustrated, network 200 may include a backend server 210, an application server 220, a media client 230, a local router 240, a display device 250, a local gateway 260, an access network 270, one or more mobile devices 280 (referred to herein collectively as mobile devices 280 or singularly as mobile device 280), and a data network 290. Media client 230, local router 240, display device 250, gateway 260, and mobile devices 280 may be located on a customer's premises and may be connected, via access network 270, to backend server 210 at, for example, a multimedia service provider's premises. Components of network 200 may interconnect via wired and/or wireless connections. One backend server 210, application server 220, media client 230, local router 240, display device 250, local gateway 260, access network 270, and data network 290, and two mobile devices 280 have been illustrated in FIG. 2. In practice, there may be more networks, servers, local gateways, media clients, display devices, and/or mobile devices. Also, in some instances, one or more of the components of network 200 may perform one or more functions described as being performed by another one or more of the components of network 200.

Backend server 210 may include one or more server entities, or other types of computation or communication devices, that gather, process, search, and/or provide information in a manner described herein. Examples of backend server 210 may include a headed device that provides broadcast television programs and/or pay-per-view (PPV) events, a video-on-demand (VOD) device or another device that provides multimedia content upon request, and/or a program guide information server that provides information related to multimedia content available to media client 230. In general, backend server 210 may provide control over (e.g., via access network 270) multimedia services for devices, such as media client 230, provided at the customer's premises. Backend server 210 may communicate with a variety of other components, such as databases, gateways, web servers, network switches or routers, television broadcast facilities, and other servers to facilitate services to customers.

Backend server 210 may also receive information from one or more media clients 230, such as mobile device/user credentials, user selections of interactive television applications, and inputs for interactive television applications. In one implementation, backend server 210 may receive, from a single media client 230, information from multiple mobile devices 280 (e.g., multiple mobile devices 280 each using a separate account associated with media client 230). Backend server 210 may authenticate mobile device credentials to permit use of interactive television applications by mobile device 280. Backend server 210 may also serve as a link between media client 230 and application server 220 to facilitate use of interactive television applications by users of mobile devices 280. For example, backend server 210 may facilitate communications initiated by mobile device 280 and forwarded by media client 230 via access network 270. While shown as a single server component in FIG. 2, in other implementations, backend server 210 may be distributed among multiple servers.

Application server 220 may include one or more server entities, or other types of computation or communication devices, that gather, process, search, and/or provide information in a manner described herein. Application server 220 may provide data to push application software and content for the interactive television applications to media client 230 and/or mobile device 280. In one implementation, application server 220 may communicate with backend server 210 through a hypertext transfer protocol over secure socket layer (HTTPS) on the Internet. In one implementation, application server 220 may be controlled by a different entity than the entity that controls backend server 210. In another implementation, application server 220 and backend server 210 may be controlled by the same entity (e.g., a multimedia service provider).

Media client 230 may include any device capable of receiving, transmitting and/or processing information to and/or from access network 170. In one implementation, media client 230 may be a closed device (e.g., including a hardware/software configuration that is not accessible to the general public) that restricts unauthorized alteration of programming delivered over access network 270. Media client 230 may receive a television signal from gateway 260, may convert the signal to a form usable by display device 250, and may transmit the signal to display device 250 for display. Examples of media client 230 may include a set-top box, a computer, a cable card, and a portable electronic device. In some implementations, media client 230 may be incorporated into display device 250, such as a television, a computer, or a portable electronic device. Media client may also allow a user to provide input for interactive menus (e.g., to navigate menu displays or input data) and to alter the programming provided to display device 250 based on a signal (e.g., a channel up or channel down signal) from, for example, a remote control (not shown).

Media client 230 may further receive and present data for interactive television applications. In implementation described herein, media client 230 may also be capable of sending data to mobile devices 280 and receiving data from mobile devices 280 (e.g., via local router 240 or via a direct wired or wireless connection between media client 230 and mobile device 280) to facilitate use of interactive television applications on mobile device 280. In one implementation, data may be exchanged through an Internet protocol (IP) session. Media client 230 may manage multiple user accounts and restrict/permit user input (e.g., user input from a mobile device 280) based on the user accounts. Media client 230 may also send data (e.g., user input from mobile device 280) to backend server 210 via access network 270.

Local router 240 may include a device that may provide connectivity between equipment within customer premises (e.g., media client 230, mobile devices 280, etc.) and between the customer premises equipment and access network 270. In one implementation, local router 270 may include a wireless router that permits mobile device 280 to connect to other customer premises equipment (e.g., media client 230). Local router 240 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. In one implementation, some or all of the features of local router 240 may be included within media client 230.

Display device 250 may include a digital or analog display via which a user may view multimedia content (including, for example, conventional television programming and/or interactive television applications). Display device 250 may refer to any device that can receive and display multimedia content delivered over access network 270 and/or through media client 230 for perception by users. Display device 250 may include technologies, such as cathode ray tube (CRT) displays, liquid crystal displays (LCDs), light-emitting diode (LED) displays, plasma displays, etc.

Gateway 260 may include a network device that provides an interface from access network 270 to media client 230, local router 240, and/or other network connectivity devices (not shown). For example, when telecommunication services are provided to the customer's premises via an optical fiber, gateway 260 may include an optical network terminal (ONT) that connects to the optical fiber. The ONT may convert between signals appropriate for display device 250 and signals appropriate for transmission over optical fiber. For example, the ONT may include a coaxial cable connection that leads to display device 250 or media client 230. The ONT may also include an Ethernet output port that connects to local router 240, a personal computer, or a voice over Internet protocol (VoIP) telephone. In other implementations, gateway 260 may include one of a number of possible gateway devices, including a satellite antenna and receiver, a coaxial cable connection, or a broadband access for Internet Protocol TV (IPTV).

Access network 270 may include a video signaling and distribution network and system that permit transfer of data between backend server 210 and media client 230/local router 240. Additionally, access network 270 may include, among other things, a firewall, a filtering mechanism, a proxy, and/or network address translation mechanisms. Access network 270 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 270 may provide customers with multimedia content provided, for example, by backend server 210 and/or application server 220. Access network 270 may also support communications between backend server 210 and media client 230 using, for example, Internet protocol (IP).

Mobile device 280 may include a device capable of transmitting and receiving data (e.g., voice, text, images, and/or multimedia data) over one or more wireless networks. For example, mobile device 280 may include a handheld device, such as a cellular telephone, an Internet protocol (IP) telephone, a personal digital assistant (PDA); a portable game and/or music playing device; and/or a laptop computer and/or palmtop receiver or other device that includes a radiotelephone transceiver with Mobile Internet Protocol (Mobile IP) capabilities. In one implementation, mobile device 280 may communicate with local router 240 via a wireless communication protocol. Mobile device 280 may include hardware and/or software to receive data for interactive television applications and to present the interactive television applications to a user. In one implementation, mobile device 280 may be capable of communicating (e.g., with media client 230 and/or local router 240) using a short-range wireless communication protocol such as Bluetooth or Wi-Fi.

Data network 290 may include components that facilitate data traffic, including for example, one or more load balancers, gateways, and databases connected by a core infrastructure (not shown). Data network may include one or more servers that may store user credentials (e.g., passwords, tokens, digital certificates, etc.) for services. Data network 290 may also include a radio access network that includes a variety of components, such as antennas, base transceiver stations (BTSs), base station controllers (BSCs), and/or interfaces for packet data servicing nodes (PDSNs) and/or mobile switching centers (MSCs). A PDSN may serve as an access gateway to data network 290. In one implementation, data network 290 may include one or more servers that store information (e.g., account information) associated with users of mobile devices 280.

In implementations described herein, a user may cause mobile device 280 to sync with media client 230 (e.g., via a wireless connection with local router 240). Mobile device 280 may, for example, obtain credentials from data network 290 and supply the credentials to media client 230 to establish permission to download and/or use an interactive television application on mobile device 280. Media client 230 may verify the credentials by communicating with backend server 210 and/or application server 220. Once the credentials are verified, media client 230 may retrieve (e.g., from local memory or from backend server 210 and/or application server 220) an interface module and provide the interface module to mobile device 280.

A user may watch programming provided to display device 250 via media client 230. Once wireless device 280 is synchronized with media client 230, the user may elect to activate a particular interactive television application (e.g., an interactive television application associated with the current programming) on mobile device 280. Using, for example, a wireless connection, mobile device 280 may request the interactive television application from media client 230. Media client 230 may supply interactive television application and may serve as an intermediary device to exchange data/communications between mobile device 280 and backend server 210 and/or application server 220 that facilitate the interactive television application.

Figure 3:
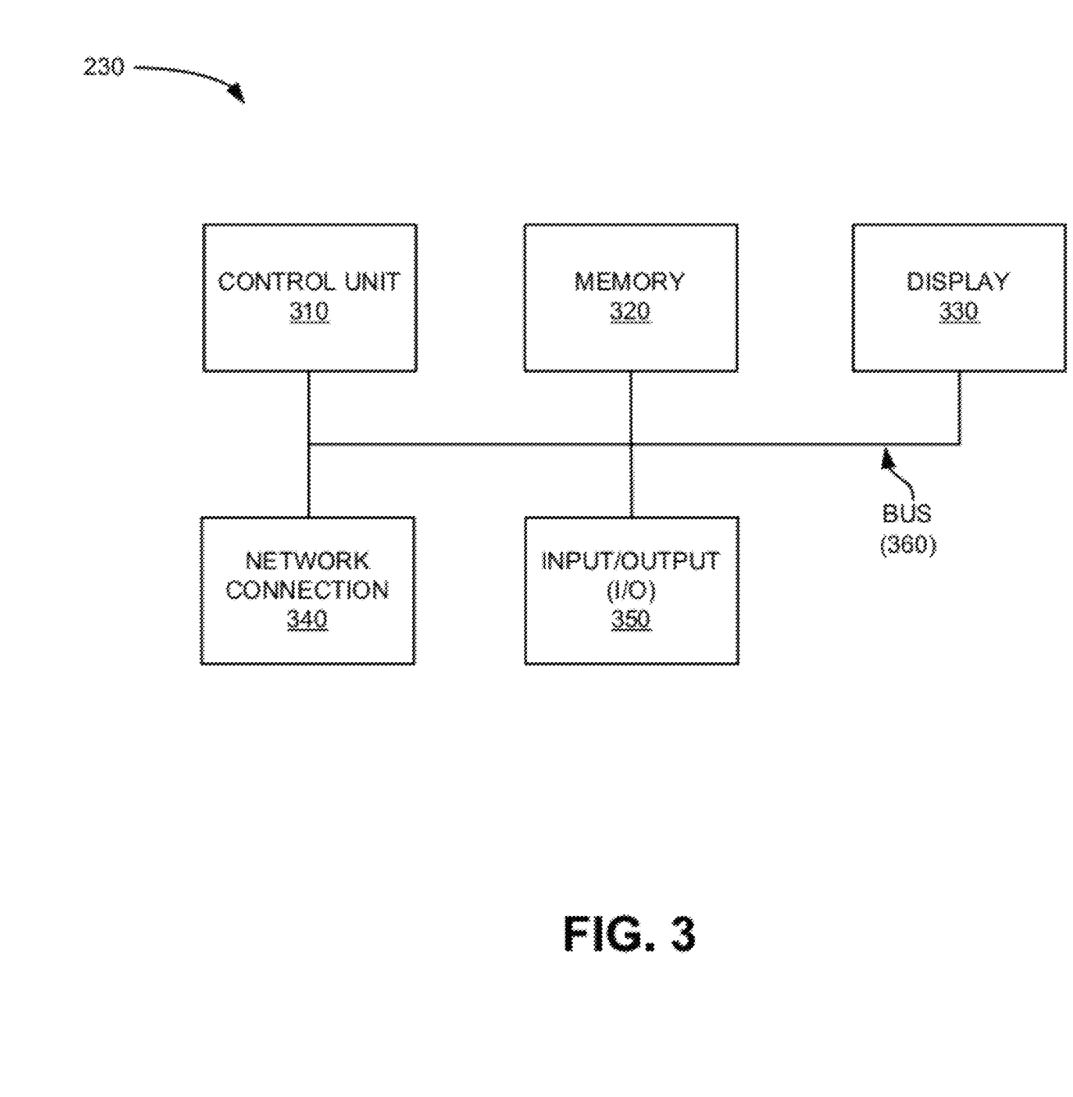
FIG. 3 is a block diagram of exemplary components of a media client that may be used in the network of FIG. 2.

FIG. 3 is diagram illustrating exemplary components of media client 230. As shown, media client 230 may include a control unit 310, a memory 320, a display 330, a network connection 340, an input/output (I/O) component 350, and a bus 360.

Control unit 310 may include one or more processors, microprocessors, or another type of processing unit that interprets and executes instructions. Among other functions, control unit 310 may collect and store viewer activity associated with television programming. Control unit 310 may execute instructions to send viewing history information to another device, such as backend server 310. Control unit 310 may also receive information and/or instructions from other devices, such as backend server 310.

Memory 320 may include one or more dynamic or static storage devices that may store information and instructions for execution by control unit 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 320 may store a viewer activity log to send at a later point in time, such as when requested by backend server 310.

Display 330 may include any component capable of providing visual information. For example, in one implementation, display 330 may be a light emitting diode (LED) or a liquid crystal display (LCD). In another implementation, display 330 may use another display technology, such as a dot matrix display, etc. Display 330 may display, for example, text (such as a time, a date or a channel selection), image, and/or video information. Display 330 may be an optional component.

Network connection 340 may include any transceiver-like mechanism that enables media client 230 to communicate with other devices and/or systems, such as backend server 310. For example, network connection 340 may include an Ethernet interface, an optical interface, a coaxial interface, a radio interface, or the like. Network connection 340 may allow for wired and/or wireless communication. Network connection 340 may be configured to connect media client 230 to a packet-based IP network.

Input/output devices 350 may generally include user input devices such as external buttons, and output devices, such as LED indicators. With input/output devices 350, a user may generally interact with media client 230. In some implementations, input/output devices 350 may be implemented via a remote control. Bus 360 may provide an interface through which components of media client 230 can communicate with one another.

As will be described in detail below, media client 230 may perform certain operations relating to displaying information and communicating viewer activities to a server, such as backend server 210. Media client 230 may perform these operations in response to control unit 310 executing software instructions contained in a computer-readable medium, such as memory 320. A computer-readable medium may be defined as a physical or logical memory device. A logical memory device may refer to memory space within a single, physical memory device or spread across multiple, physical memory devices. The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of media client 230, in other implementations, media client 230 may include fewer, different, differently arranged, or additional components than those depicted in FIG. 3. In still other implementations, one or more components of media client 230 may perform one or more other tasks described as being performed by one or more other components of media client 230.

Figure 4:
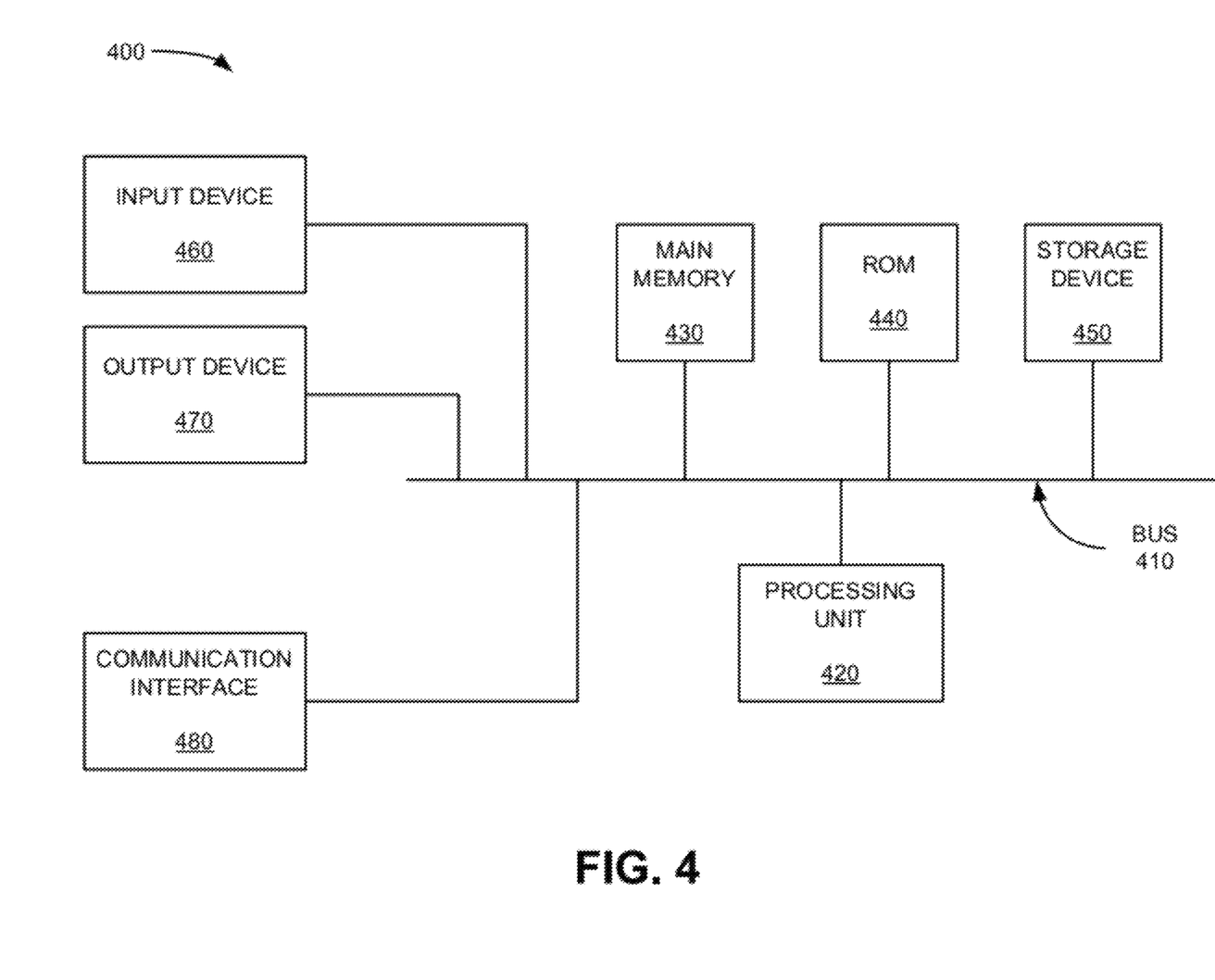
FIG. 4 is a block diagram of exemplary components of a device that may correspond to a backend server and/or an application server of FIG. 2.

FIG. 4 is a diagram of exemplary components of a device 400 that may correspond to backend server 210, application server 220, or another computing device. As illustrated, device 400 may include a bus 410, a processing unit 420, a main memory 430, a read-only memory (ROM) 440, a storage device 450, an input device 460, an output device 470, and a communication interface 480.

Bus 410 may include a path that permits communication among the components of device 400. Processing unit 420 may include one or more processors, microprocessors, or other types of processing units, such as application-specific integrated circuits (ASICs), field-programmable gate arrays (FPGAs), etc., that may interpret and execute instructions.

Main memory 430 may include a RAM or another type of dynamic storage device that stores information and instructions for execution by processing unit 420. ROM 440 may include a ROM device or another type of static storage device that may store static information and instructions for use by processing unit 420. Storage device 450 may include a magnetic and/or optical recording medium and its corresponding drive. In one implementation, storage device may include a database. Storage device 450 may store, for example, viewer account activity for particular media clients 230 or all media clients 230 associated with a subscription multimedia service provider.

Input device 460 may include a mechanism that permits an operator to input information to device 400, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables device 400 to communicate with other devices and/or systems, such as media client 230.

As will be described in detail below, device 400 may perform certain operations associated with providing a mobile interface for interactive television applications. Device 400 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 4 illustrates exemplary components of device 400, in other implementations, device 400 may include fewer, different, differently arranged, or additional components than those depicted in FIG. 4. In still other implementations, one or more components of device 400 may perform one or more other tasks described as being performed by one or more other components of device 400.

Figure 5:
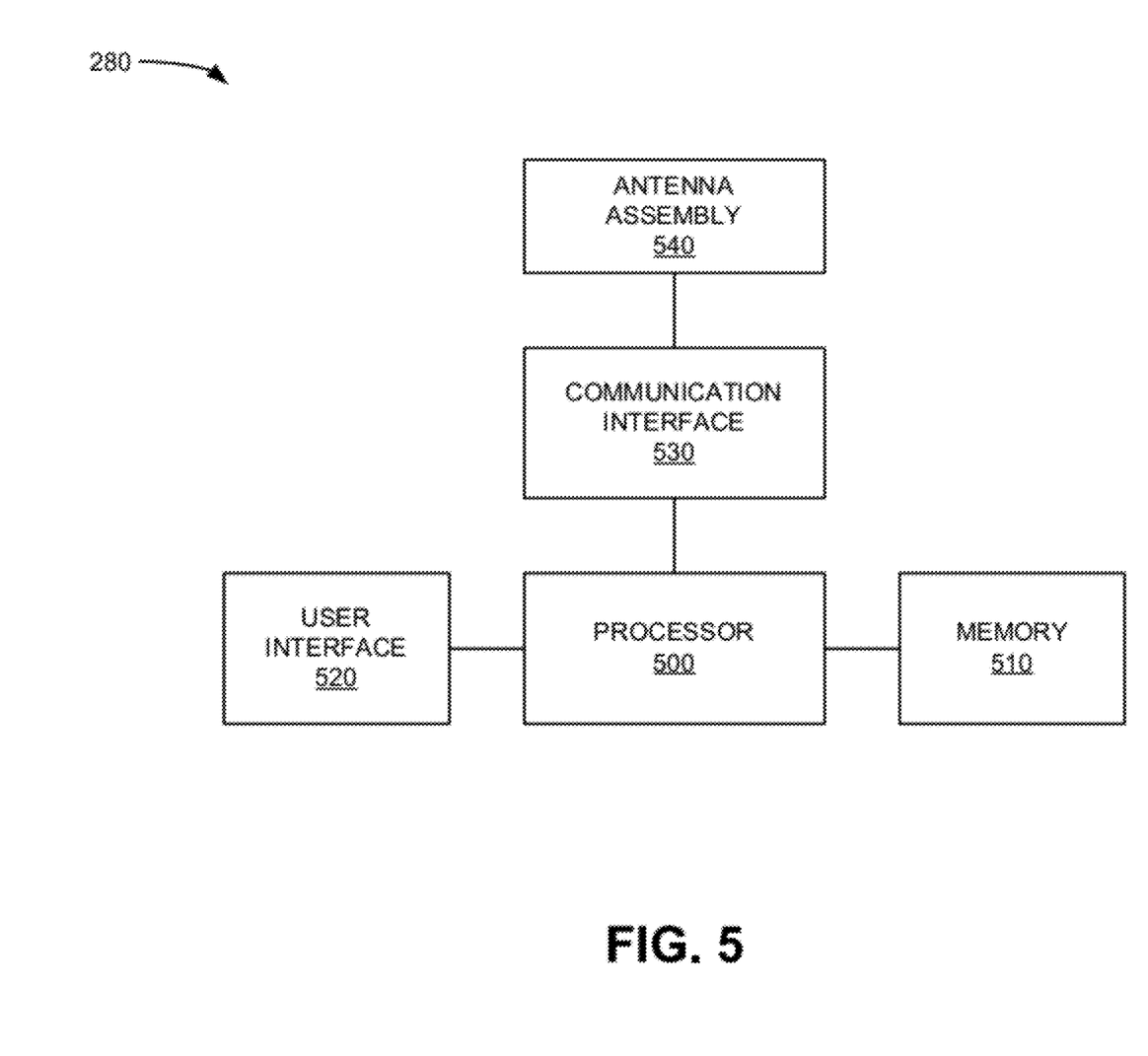
FIG. 5 is a block diagram of exemplary components of a mobile device that may be used in the network of FIG. 2.

FIG. 5 is a diagram of exemplary components of mobile device 280. As illustrated, mobile device 280 may include a processor 500, a memory 510, a user interface 520, a communication interface 530, and/or an antenna assembly 540.

Processor 500 may include one or more microprocessors, ASICs, FPGAs, or the like. Processor 500 may control operation of mobile device 280 and its components. Memory 510 may include a RAM, a ROM, and/or another type of memory to store data and instructions that may be used by processor 500. In one implementation, memory 510 may store data used to display a graphical user interface, such as an interactive television application.

User interface 520 may include mechanisms for inputting information to mobile device 280 and/or for outputting information from mobile device 280. Examples of input and output mechanisms may include buttons (e.g., control buttons, keys of a keypad, a joystick, etc.); a speaker to receive electrical signals and output audio signals; a microphone to receive audio signals and output electrical signals; a display to receive touch input and/or to output visual information; a vibrator to cause mobile device 280 to vibrate; and/or a camera to receive video and/or images.

Communication interface 530 may include, for example, a transmitter that may convert baseband signals from processor 500 to radio frequency (RF) signals and/or a receiver that may convert RF signals to baseband signals. Alternatively, communication interface 530 may include a transceiver to perform functions of both a transmitter and a receiver. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network (e.g., data network 290) and/or devices connected to a network (e.g., local router 240).

As will be described in detail below, mobile device 280 may perform certain operations described herein in response to processor 500 executing software instructions of an application contained in a computer-readable medium, such as memory 510. The software instructions may be read into memory 510 from another computer-readable medium or from another device via communication interface 530. The software instructions contained in memory 510 may cause processor 500 to perform processes that will be described later. Alternatively, hardwired circuitry may be used in place of or in combination with software instructions to implement processes described herein. Thus, implementations described herein are not limited to any specific combination of hardware circuitry and software.

Although FIG. 5 shows exemplary components of mobile device 280, in other implementations, mobile device 280 may contain fewer, different, differently arranged, or additional components than depicted in FIG. 5. In still other implementations, a component of mobile device 280 may perform one or more other tasks described as being performed by another component of mobile device 280.

Figure 6:
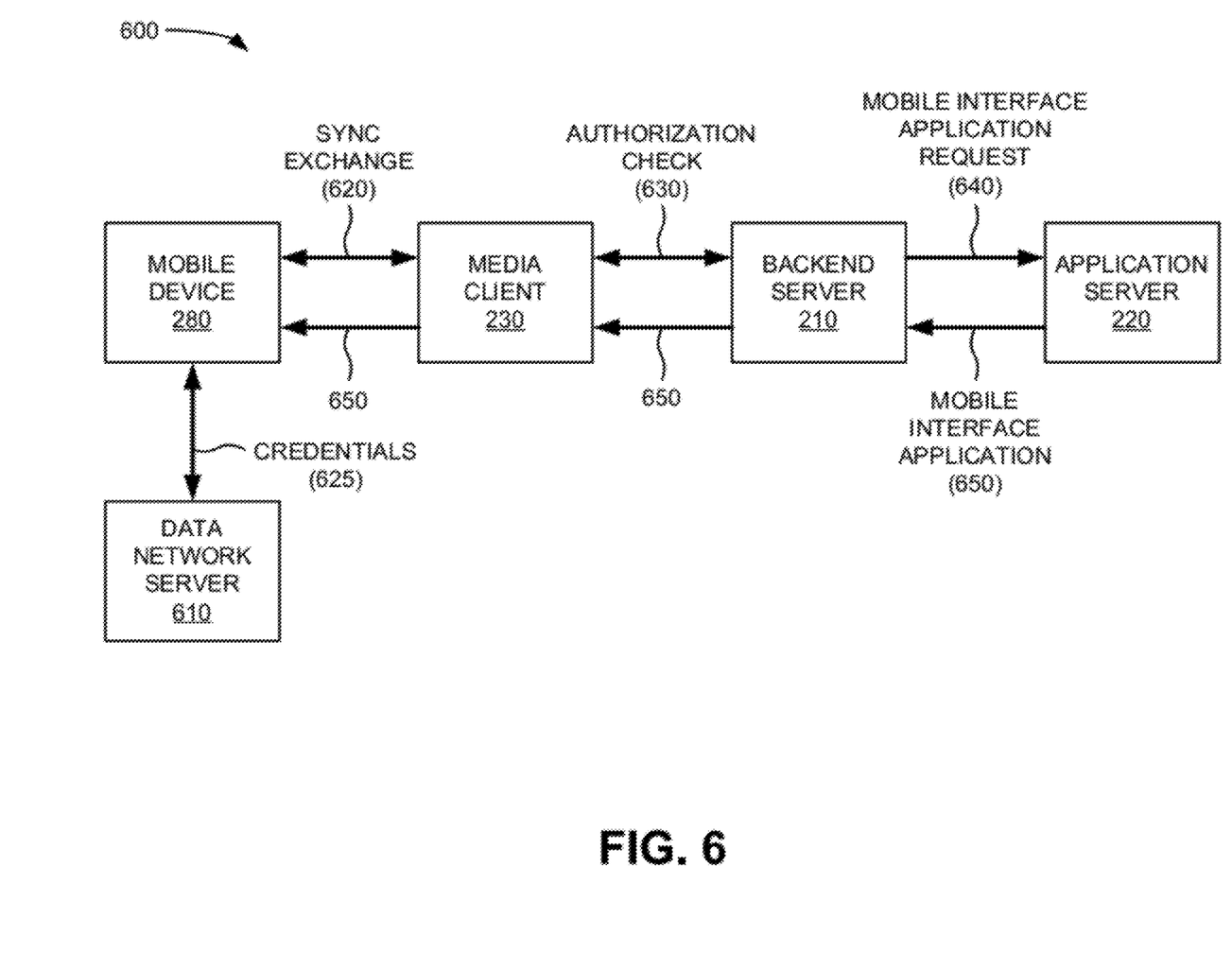
FIG. 6 depicts a diagram of exemplary interactions among components of an exemplary portion of the network illustrated in FIG. 2.

FIG. 6 depicts a diagram of exemplary interactions among components of an exemplary portion 600 of network 200. As illustrated, exemplary network portion 600 may include backend server 210, application server 220, media client 230, mobile device 280, and a data network server 610. Backend server 210, application server 220, media client 230, and mobile device 280 may include the features described above in connection with, for example, FIG. 2. Data network server 610 may be included within data network 290 and may include, for example, components of device 400 (FIG. 4).

As further shown in FIG. 6, media client 230 or mobile device 280 may initiate a sync exchange 620 between media client 230 and mobile device 280. For example, a user may initiate a command (e.g., via a remote control associated with media client 230) to identify a local wireless device. Alternatively, mobile device 280 may send a signal to media client 230 (e.g., via local router 240 or via a direct wireless connection) to establish a session with media client 230. During sync exchange 620, media client 230 and wireless device 280 may exchange information to verify access rights of mobile device 280. In one implementation, mobile device 280 may retrieve credential 625 from data network server 610 to facilitate sync exchange 620.

Media client 230 may send an authorization check 630 to backend server 210 to verify if mobile device 280 (e.g., based on credentials 620) is permitted interface with media client 230. Backend server 210 may, for example, determine if mobile device 280 is associated with a particular subscriber account (e.g., an account for multimedia services that includes both television and mobile phone) and authorize the connection between media client 230 and mobile device 280. If backend server 210 identifies mobile device 280, backend server 210 may also forward a mobile interface application request 640 to application server 220. In one implementation, mobile interface application request 640 may identify mobile device 280 information (e.g., mobile device software version, model type, etc. obtained from mobile device 280/credentials 635), media client 230 information (e.g., device hardware model, software version, etc.), and/or user account information to allow application server 220 to determine an appropriate mobile interface application. In another implementation, backend server 210 may determine the appropriate mobile interface application and simply include an identifier for the appropriate mobile interface application in mobile interface application request 640.

Application server 220 may provide the mobile interface application 650 to backend server 210. Mobile interface application 650 may include software to enable mobile device 280 to send signals to and receive signals from media client 230 (e.g., via local router 240 or via a direct wireless connection). Backend server 210 and media client 230 may forward mobile interface application 650 to mobile device 280.

Although FIG. 6 shows exemplary components of network portion 600, in other implementations, network portion 600 may contain fewer, different, differently arranged, or additional components than depicted in FIG. 3. Additionally, or alternatively, one or more components of network portion 600 may perform one or more other tasks described as being performed by one or more other components of network portion 600.

Figure 7:
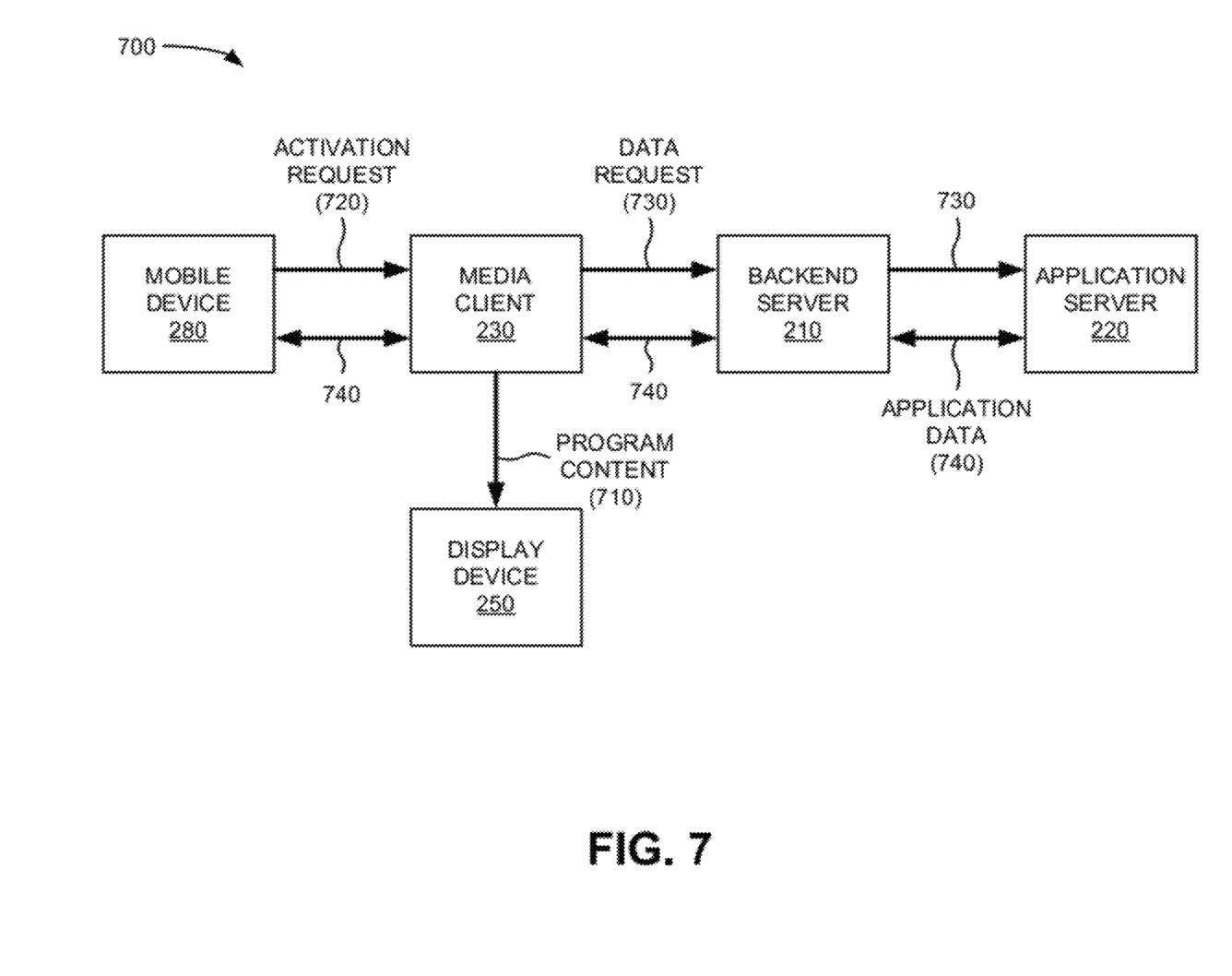
FIG. 7 depicts a diagram of exemplary interactions among components of another exemplary portion of the network illustrated in FIG. 2.

FIG. 7 depicts a diagram of exemplary interactions among components of another exemplary portion 700 of network 200. As illustrated, exemplary network portion 700 may include backend server 210, application server 220, media client 230, display device 250, and mobile device 280. Backend server 210, application server 220, media client 230, display device 250, and mobile device 280 may include the features described above in connection with, for example, FIG. 2.

As further shown in FIG. 7, media client 230 may cause program content 710 (e.g., content received from backend sever 210) to be displayed on display device 250. A user may watch the program content on display device 250 and elect to activate a particular interactive television application (e.g., an interactive television application associated with the current program content) on mobile device 280. Assuming mobile device 280 has previously been synchronized with media client 230, the user may cause mobile device 280 to send an activation request 720 to media client 230 to request a particular interactive television application. Activation request 720 may include the identity of mobile device 280 and whether mobile device 280 already has application software for the requested interactive television application.

In response to activation request 720, media client 230 send a data request 730 to backend server 210. Data request 730 may include, for example, a request for data to support the interactive television application (e.g., real time data, such as interactive links, message traffic, etc. that may be associated with program content 710) and/or software to run the interactive television application. Backend server 210 may forward data request 730 to application server 220, and application server 220 may retrieve application data 740. Application data 740 may include, for example, data to support the requested interactive television application and/or software to run the interactive television application. Application server 220 may send application data 740 to backend server 210, which may, in turn, forward application data 740 to media client 230.

Media client 230 may, if necessary, synchronize application data 740 with program content 710 and forward application data 740 to mobile device 280 (e.g., via local router 240 or via a direct wireless connection). Mobile device 280 may present the interactive television application to the user and may receive additional commands/data from user input. Mobile device 280 may send application data 740 corresponding to the additional user input to media client 230, which may serve as an intermediary device to exchange application data 740 between mobile device 280 and backend server 210 and/or application server 220 to facilitate the interactive television application.

Although FIG. 7 shows exemplary components of network portion 700, in other implementations, network portion 700 may contain fewer, different, differently arranged, or additional components than depicted in FIG. 7. Additionally, or alternatively, one or more components of network portion 700 may perform one or more other tasks described as being performed by one or more other components of network portion 700.

Figure 8:
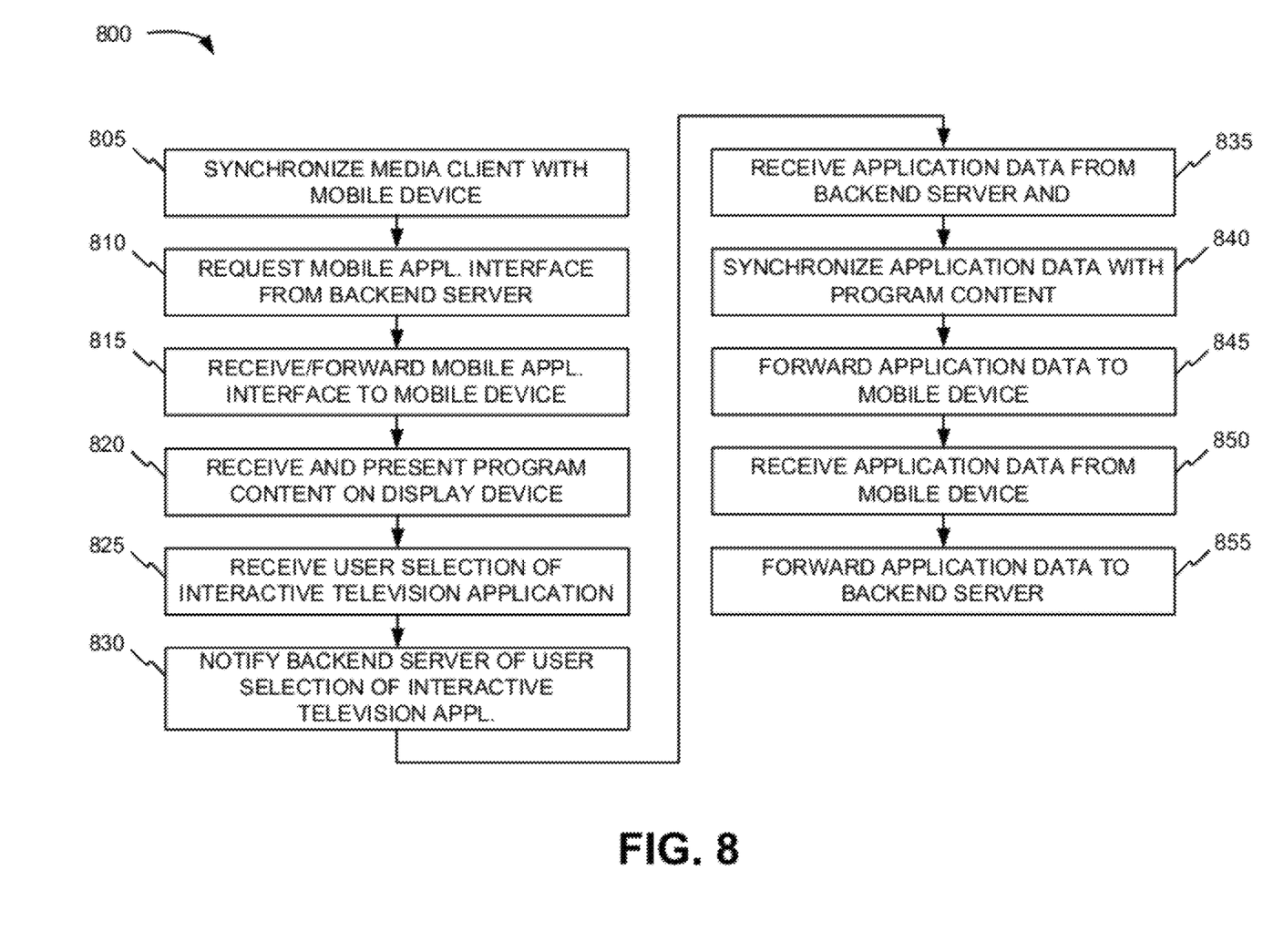
FIG. 8 is a flow chart illustrating an exemplary process for providing a mobile interface for interactive television applications in a subscription multimedia network.

FIG. 8 provides a flow chart of an exemplary process 800 for providing a mobile interface for interactive television applications in a subscription multimedia network. Some or all of process 800 may be performed by one or more media clients associated with a subscription multimedia service, such as media client 230. In some implementations, some or all of process 800 may also be performed by one or more servers (e.g., backend server 210, application server 220) in association with media client 230.

Process 800 may include synchronizing a media client with a mobile device (block 805), requesting a mobile application interface from a backend server (block 810), and receiving and forwarding the mobile application interface to the mobile device (block 815). For example, as described above in connection with FIG. 6, media client 230 or mobile device 280 may initiate sync exchange 620 between media client 230 and mobile device 280. For example, a user may initiate a command (e.g., via a remote control associated with media client 230) to identify a local wireless device. Alternatively, mobile device 280 may send a signal to media client 230 (e.g., via local router 240 or via a direct wireless connection) to establish a session with media client 230. During sync exchange 620, media client 230 and wireless device 280 may exchange information to verify access rights of mobile device 280 to the interactive television applications. Media client 230 may forward mobile device 280 information to backend server 210, and, if authenticated by backend server 210, mobile interface application 650 may be provided to media client 230 (e.g., via application server 220 and/or backend server 210). Mobile interface application 650 may include software to enable mobile device 280 to send signals to and receive signals from media client 230 (e.g., via local router 240 or via a direct wireless connection). Media client 230 may forward mobile interface application 650 to mobile device 280.

Process 800 may also include receiving and presenting program content on a display device (block 820), receiving a user selection of an interactive television application (block 825), and notifying the backend server of the user selection of the interactive television application (block 830). For example, as described above in connection with FIG. 7, media client 230 may cause program content 710 (e.g., content received from backend sever 210) to be displayed on display device 250. A user may watch the program content on display device 250 and elect to activate a particular interactive television application (e.g., an interactive television application associated with the current program content) on mobile device 280. Assuming mobile device 280 has previously been synchronized with media client 230, the user may cause mobile device 280 to send activation request 720 to media client 230 to request a particular interactive television application. Activation request 730 may include the identity of mobile device 280 and whether mobile device 280 already has application software for the requested interactive television application.

Process 800 may further include receiving application data from the backend server (block 835), synchronizing the application data with the program content (block 840), and forwarding the application data to the mobile device (block 845). For example, as described above in connection with FIG. 7, media client 230 send data request 730 to backend server 210. Data request 730 may include, for example, a request for data to support the interactive television application (e.g., real time data, such as interactive links, message traffic, etc. that may be associated with program content 710) and/or software to run the interactive television application. Backend server 210 may retrieve application data 740 and forward application data 740 to media client 230. Application data 740 may include, for example, data to support the requested interactive television application and/or software to run the interactive television application. Media client 230 may forward the application to mobile device 280 for presentation, by the mobile device, of the interactive television application.

Process 800 may also include receiving application data from the mobile device (block 850) and forwarding the application data to the backend server (block 855). For example, as described above in connection with FIG. 7, mobile device 280 may send application data 740 corresponding to additional user input to media client 230, which may serve as an intermediary device to exchange application data 740 between mobile device 280 and backend server 210 and/or application server 220 to facilitate the interactive television application.

Figure 9:
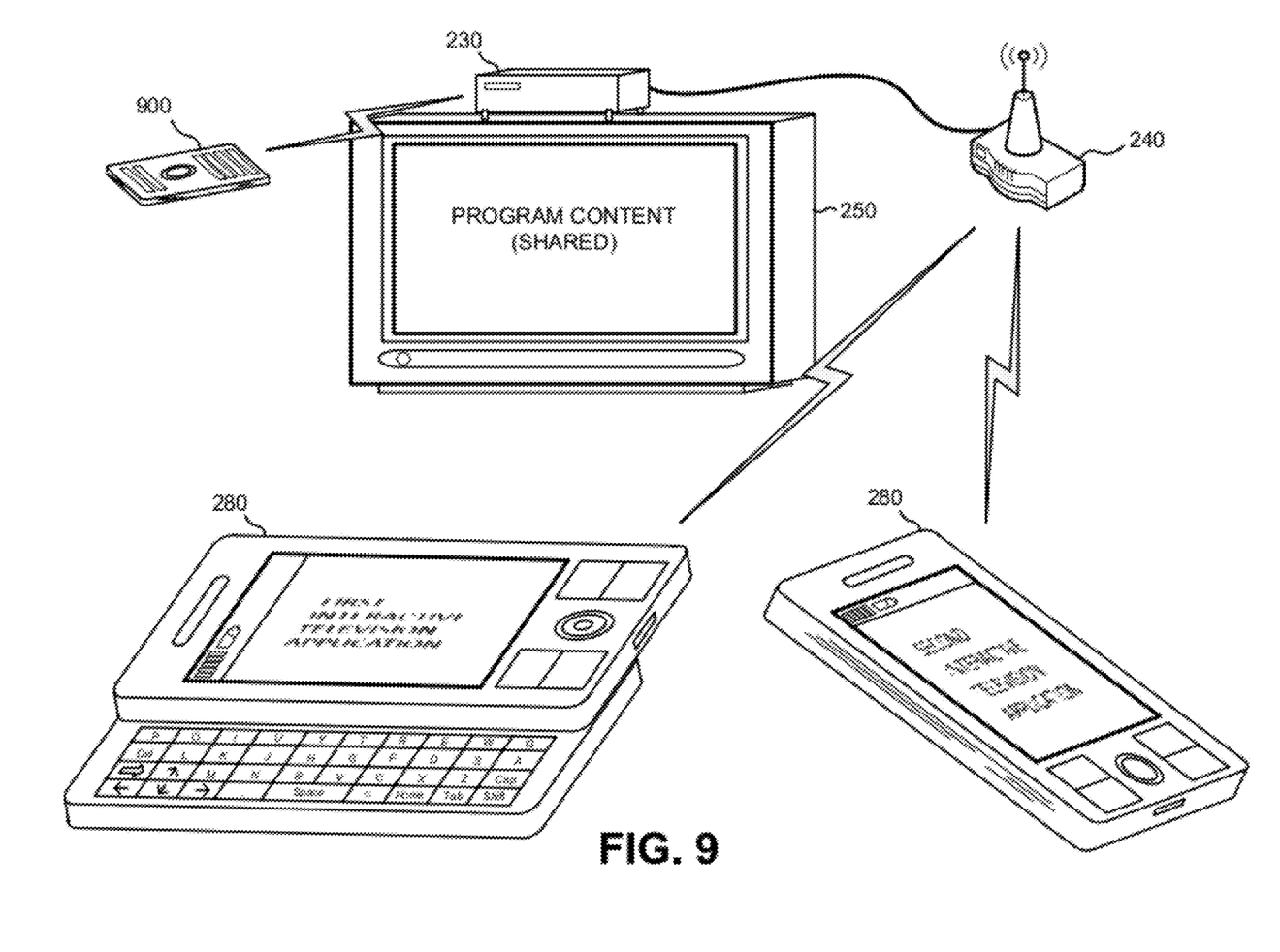
FIG. 9 is an exemplary diagram illustrating implementations of a mobile interface for interactive television applications in a subscription multimedia network.

FIG. 9 provides an exemplary diagram illustrating implementations of a mobile interface for interactive television applications in a subscription multimedia network according to implementations described herein. Referring to FIG. 9, one or more users (not shown) may view shared program content on display device 250. The display on display device 250 may be controlled by media client 230 as directed by user commands from a remote control 900.

The viewer may choose to enable use of a mobile interactive television application associated with the shared program content. In one implementation, the user may signal media client 230 to enable a mobile interactive television application using a menu screen on display device 250 (via remote control 900) or a dedicated key on remote control 900. The signal from remote control 900 may cause media client 230 to establish a communication session with one or more of mobile devices 280. As shown in FIG. 9, mobile devices 280 may communicate with media client 230 via local router 240. In other implementations, mobile devices 280 may communicate with media client 230 via a direct wired (e.g., universal serial bus (USB)) or wireless (e.g., Bluetooth or Wi-Fi) connection.

In response to the request to enable the mobile interactive television application, media client 230 may provide the application and/or data to the requesting mobile device 280. As shown in FIG. 9, two or more mobile devices 280 may communicate with media client 230 to use separate mobile interactive television applications. Thus, media client 230 may support multiple copies of the same mobile interactive television application running on separate devices. An example of using multiple copies of the same mobile interactive television application may include two users watching a single television while using separate copies (e.g., separate accounts) of a social networking program on different mobile devices. In other instances, media client 230 may support different mobile interactive television applications running simultaneously on separate devices. An example of using different mobile interactive television applications may include two (or more) people watching a single television and listening to a different second audio program (SAP) channel via their respective mobile devices, so that each person can listen in a different language.

The illustration of FIG. 9 is provides an example for providing a mobile interface for interactive television applications in a subscription multimedia network. Other formats and variations may be used.

Implementations described herein may provide systems and/or methods that may be implemented by a media client for a subscription multimedia network. The media client may present, on a display device, program content received from a backend server. The media client may also receive, from a mobile device, a signal requesting access to an interactive television application, where the interactive television application is related to the program content. The media client may receive, from the backend server, data for the interactive television application, and may forward, to the mobile device, the data for the interactive television application for presentation on the mobile device.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowchart of FIG. 8, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method implemented by a media client, the method comprising:
presenting, by the media client and on a display device, program content received from a backend server, and an interactive television application that is related to the program content;
receiving, by the media client and from a mobile device, a request to shift the interactive television application from the display device to the mobile device;
causing, by the media client and based on receiving the request, the display device to cease presenting the interactive television application;
retrieving, by the media client and from the backend server, data for the interactive television application;
based on receiving the request, forwarding, by the media client and to the mobile device, the data for the interactive television application to present on the mobile device;
receiving, by the media client and from the mobile device, user input for the interactive television application; and
forwarding, by the media client and to the backend server, the user input.

2. The method of claim 1, where the data for the interactive television application includes real time data.

3. The method of claim 1, further comprising:
receiving, by the media client and from another mobile device, another request for access to another interactive television application, where the other interactive television application is related to the program content;
retrieving, by the media client and from the backend server, data for the other interactive television application; and
forwarding, by the media client and to the other mobile device, the data for the other interactive television application to present on the other mobile device.

4. The method of claim 3, where the mobile device and the other mobile device synchronize with the media client using separate accounts.

5. The method of claim 1, further comprising:
synchronizing, by the media client, the program content presented on the display device and the forwarding of the data to the mobile device.

6. The method of claim 1, where the mobile device comprises one or more of:
a radiotelephone,
a personal communications system (PCS) terminal,
a personal digital assistant (PDA), or
a laptop computer.

7. The method of claim 1, further comprising:
retrieving, by the media client, credentials from the mobile device,
where forwarding, to the mobile device, the data for the interactive television application is based on the retrieving the credentials.

8. A method performed by one or more devices within a subscription multimedia network, the method comprising:
sending, by one of the one or more devices and to a media client, program content for presentation on a display device;
receiving, by one of the one or more devices and from the media client, a first request for access, via the display device, to a first interactive television application, the first interactive television application relating to the program content;
sending, by one of the one or more devices and based on the first request, data, for the first interactive television application, to the media client;
receiving, by one of the one or more devices and from the media client, data from the display device pertaining to the first interactive television application;
forwarding, by one of the one or more devices, the data from the display device to a first application server associated with the first interactive television application;
receiving, by one of the one or more devices and from the media client, a second request for access, via a mobile device, to a second interactive television application, the second interactive television application relating to the program content, the second interactive television application differing from the first interactive television application;
sending, by one of the one or more devices and based on the second request, data, for the second interactive television application, to the media client;
receiving, by one of the one or more devices and from the media client, data from the mobile device pertaining to the second interactive television application; and forwarding, by one of the one or more devices, the data from the mobile device to a second application server associated with the second interactive television application.

9. The method of claim 8, further comprising:
receiving, by one of the one or more devices and from the media client, a third request for another mobile device to access the first interactive television application; and
sending, by one of the one or more devices and based on the third request, the data for the first interactive television application, via the media client, to the other mobile device,
the media client causing the display device to cease presenting the first interactive television application based on sending the data for the first interactive television application to the other mobile device.

10. The method of claim 8, where the mobile device and the other mobile device have separate accounts within the subscription multimedia network.

11. The method of claim 8, further comprising:
receiving, by one of the one or more devices and from the media client, credentials of the mobile device;
authenticating the credentials of the mobile device; and
sending the data for the second interactive television application based on authenticating the credentials of the mobile device.

12. The method of claim 8, where the first application server and the second application server are external to the subscription multimedia network.

13. The method of claim 8, where the first application server and the second application server are internal to the subscription multimedia network.

14. A device, comprising:
a memory to store a plurality of instructions; and
a processor to execute instructions in the memory to:
present, on a display device, program content received from a backend server,
receive a first request for access, via the display device, to an interactive television application, the interactive television application being related to the program content,
receive, from the backend server, data for the interactive television application,
forward, to the display device, the data for the interactive television application for presentation on the display device in connection with the program content,
receive, from a mobile device, a second request for access the interactive television application,
cause, based on the second request, the display device to cease presenting the data for the interactive television application, and
forward, to the mobile device, the data for the interactive television application for presentation on the mobile device.

15. The device of claim 14, where the processor is further to execute instructions to:
receive, from the mobile device, user input for the interactive application, and
forward, to the backend server, the user input.

16. The device of claim 14, where the device is a media client located at a customer's premises.

17. The device of claim 14, where the processor is further to execute instructions to:
establish an Internet protocol (IP) session with the mobile device, and
where the processor, when forwarding the data for the interactive television application to the mobile device, is further to:
forward, to the mobile device, the data for the interactive television application via the IP session.

18. The device of claim 14, where the processor is further to execute instructions to:
receive, from another mobile device, a third request for access to the interactive television application, and
forward, to the other mobile device and based on the third request, the data for the interactive television application for presentation on the other mobile device concurrently with the presentation of the in data for the interactive television application on the mobile device.

19. A device, comprising:
a memory to store a plurality of instructions; and
a processor to execute instructions in the memory to:
send, to a media client, program content and first data for an interactive television application for presentation on a display device, the interactive television application being related to the program content;
receive, from the media client, a request for mobile device access to the interactive television application being presented on the display device;
send, to the media client and based on the request, second data for the interactive television application for presentation on the mobile device, the second data being selected based on the mobile device;
receive, from the media client, data from the mobile device pertaining to the interactive television application; and
forward the data from the mobile device to an application server for the interactive television application.

20. The device of claim 19, where the device is a server for a subscription multimedia network.

21. The device of claim 19, where the processor is further to execute instructions to:
receive, from the media client, another request for another mobile device to access the interactive television application, and
send, to the media client and based on the other request, third data for the interactive television application, the third data differing from the second data, and the third data being selected based on the other mobile device comprising a particular type of mobile device.

* * * * *